United States Patent

Yamaguchi

[11] Patent Number: 5,966,561
[45] Date of Patent: Oct. 12, 1999

[54] COLOR-IMAGE FORMING APPARATUS HAVING INTERMEDIATE TRANSFER MEMBER AND CONTROLLER FOR CONTROLLING THE TRANSFER BIAS

[75] Inventor: Chiseki Yamaguchi, Niigata, Japan

[73] Assignee: NEC Corporation, Tokyo, Japan

[21] Appl. No.: 08/985,254

[22] Filed: Dec. 4, 1997

[30] Foreign Application Priority Data

Dec. 24, 1996 [JP] Japan ................................. 8-344036

[51] Int. Cl.⁶ .................................................. G03G 15/16
[52] U.S. Cl. ................................ 399/66; 399/49; 399/302
[58] Field of Search .............................. 399/66, 72, 302, 399/308, 314, 45, 49; 324/694–696, 705

[56] References Cited

U.S. PATENT DOCUMENTS

| | | | |
|---|---|---|---|
| 4,134,147 | 1/1979 | Watanabe | 361/235 |
| 4,772,918 | 9/1988 | Karasawa et al. | 399/66 |
| 5,041,877 | 8/1991 | Matsumoto | 399/66 |
| 5,182,598 | 1/1993 | Hara et al. | 399/303 |
| 5,291,252 | 3/1994 | Kawaishi | 399/301 |
| 5,291,253 | 3/1994 | Kumasaka et al. | 399/66 |
| 5,300,984 | 4/1994 | Fuma et al. | 399/66 |
| 5,608,506 | 3/1997 | Omoto | 399/315 |
| 5,621,504 | 4/1997 | Wakamatsu et al. | 399/1 |
| 5,631,725 | 5/1997 | Harasawa et al. | 399/66 |
| 5,701,569 | 12/1997 | Kanazawa et al. | |
| 5,761,568 | 6/1998 | Haragakiuchi et al. | 399/44 |

FOREIGN PATENT DOCUMENTS 5-27548 2/1993 Japan .
6-67551 3/1994 Japan .

*Primary Examiner*—Robert Beatty
*Attorney, Agent, or Firm*—Sughrue, Mion, Zinn, Macpeak & Seas, PLLC

[57] ABSTRACT

An electrophotographic printer apparatus for printing a color image is provided with a receptive layer for recording an electrostatic latent image and a developer unit for applying the toners of a number of colors to the electrostatic latent image. Also provided are an intermediate transfer medium to which toner images formed in a layered form on the receptive layer are transferred, and a power supply for applying a difference in potential between the intermediate transfer medium and the receptive layer. Further provided are a current detector for detecting a value of an electric current flowing across the intermediate transfer medium and the receptive layer, and a transfer unit for transferring the toner image formed on the intermediate transfer medium to a recording medium. Furthermore, a main controller is provided for effecting control in setting the potential difference between the intermediate transfer medium and the receptive layer to V1, in obtaining a current value I1 from the current detector when a toner layer is not present between the intermediate transfer medium and the receptive layer, in obtaining a current value IX from the current detector when the toner layer is present between the intermediate transfer medium and the receptive layer, and in optimally correcting operating conditions of an image-forming element by determining characteristics of the toner layer on the basis of a difference between the current value I1 and the current value IX.

20 Claims, 6 Drawing Sheets

F I G. 1
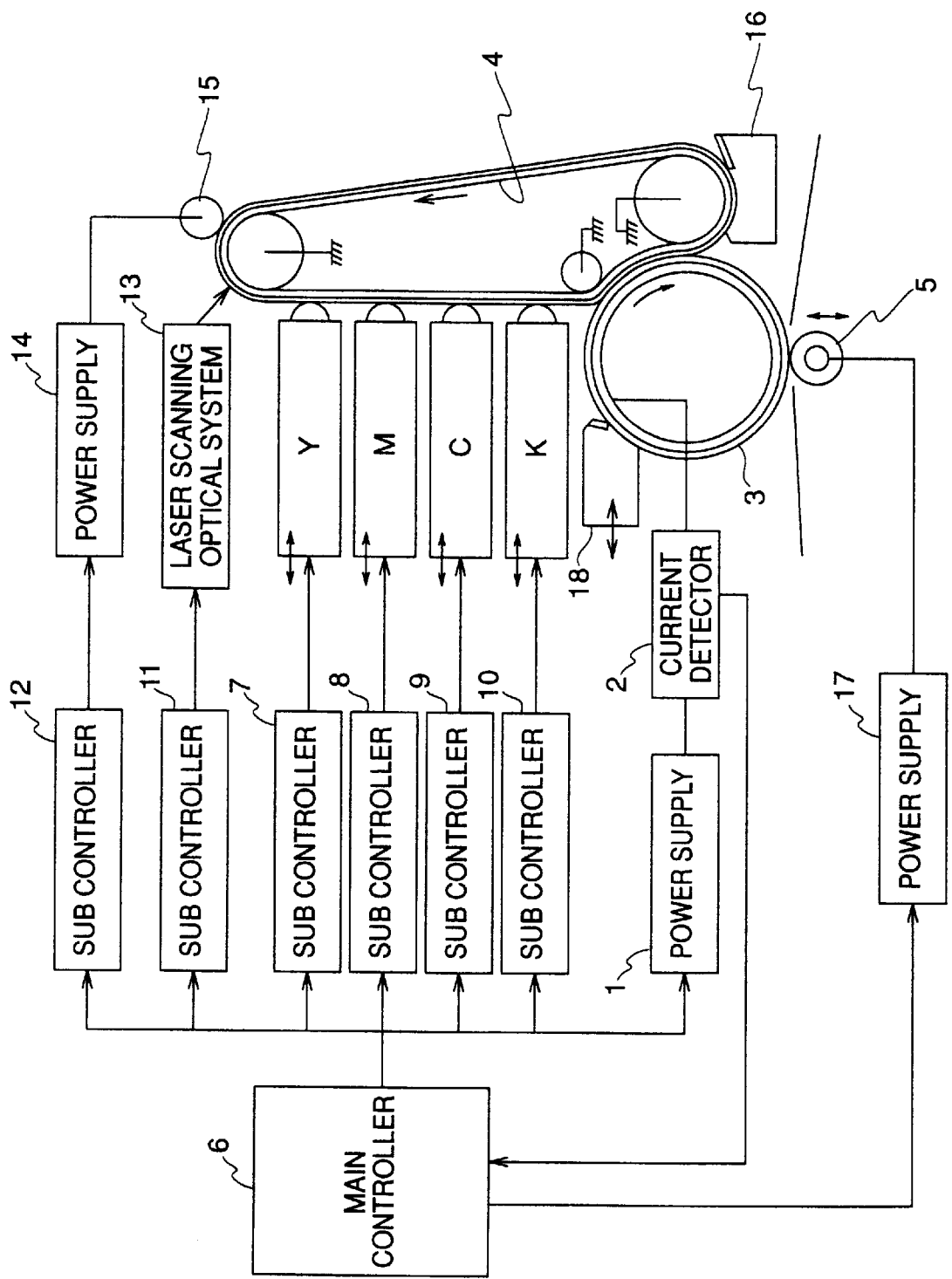

F I G. 2
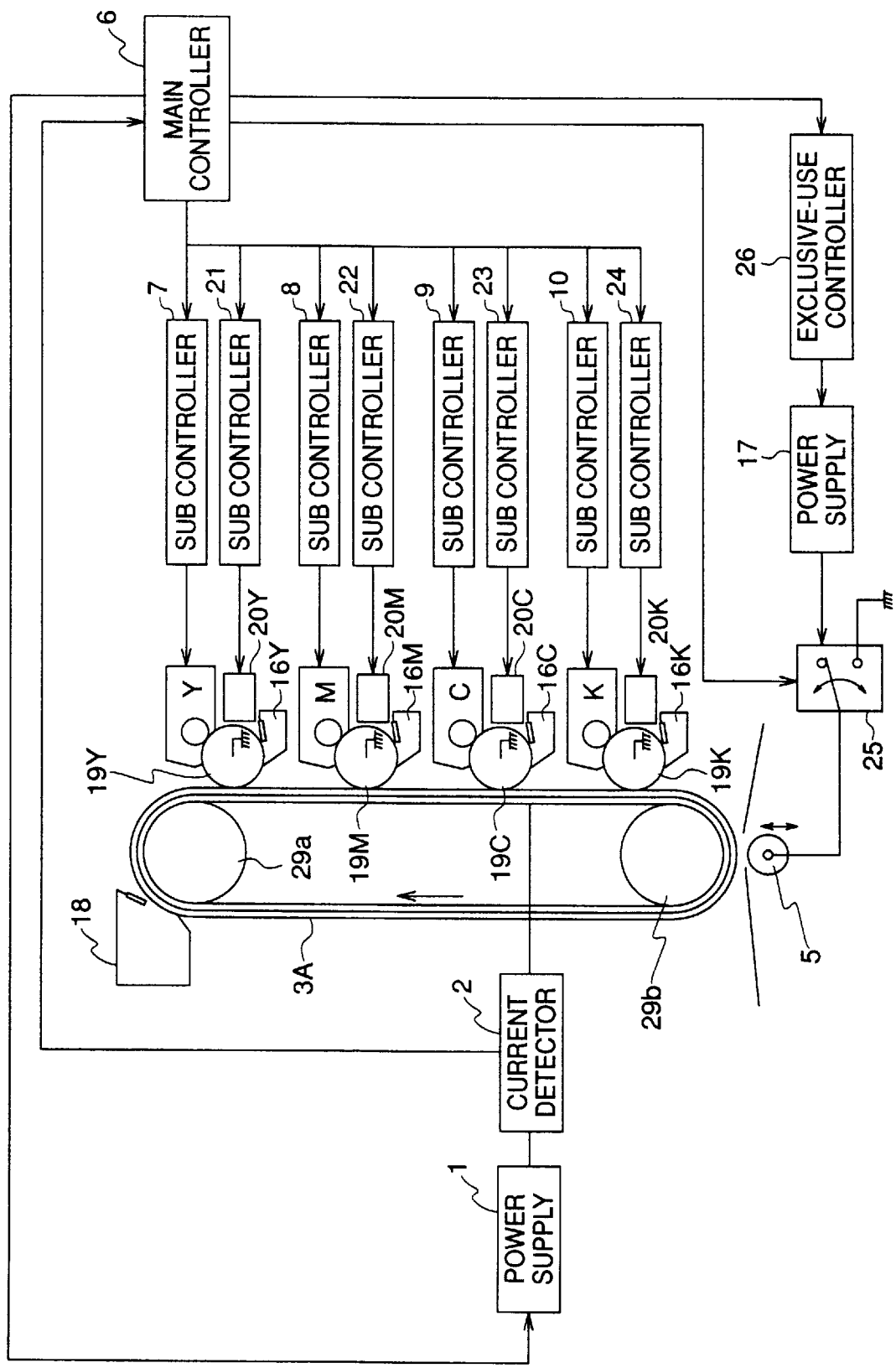

COLOR-IMAGE FORMING APPARATUS HAVING INTERMEDIATE TRANSFER MEMBER AND CONTROLLER FOR CONTROLLING THE TRANSFER BIAS

FIELD OF THE INVENTION

The present invention relates to a color-image forming apparatus using an electrophotographic process, and more particularly to a color-image forming apparatus which effects at least two transfers until an image is transferred to a recording medium.

BACKGROUND OF THE INVENTION

Various methods are known as a method of color-image forming using the electrophotographic process. For example, in a first method, a plurality of monochromatic toner images of mutually different colors are formed on a toner image carrier. These toner images are consecutively transferred to one location on a recording medium in a superposed manner. In a second method, a plurality of monochromatic toner images of mutually different colors are formed on a toner image carrier. These toner images are then consecutively transferred to one portion of an intermediate transfer medium in a superposed manner. Subsequently, the superposed images are collectively transferred from the intermediate transfer medium to a recording medium. In a third method, toner images of a number of colors are formed directly on a toner image carrier. The toner images are then collectively transferred to a recording medium. These methods can be realized by an apparatus having only one light source for forming latent images. Further, these methods can also be realized by an apparatus having latent-image forming light sources in a number corresponding to the number of the toner colors. The latter type is referred to as a tandem type.

The above-described methods have both advantages and disadvantages. The first method excels in the transferability of the respective color toners. In addition, since the basic principle of the first method is simple, the first method has been widely put to practical use. However, development is substantially affected by the characteristics of the recording medium, and development on small-sized paper and thick paper is difficult. In the third method, the circumferential length of the toner image carrier is required to be as long as the length of the recording medium. For this reason, the apparatus becomes large in size. In addition, the formation of a latent image on the toner image carrier is influenced by the toner image which was earlier attached to and formed on the toner image carrier. For this reason, this method is inferior in the color reproducibility of a final image. Accordingly, in recent years, studies have been made on the second method using the intermediate transfer medium, and apparatuses based on this method have been commercialized. According to the second method, however, two transfers are effected before the toner images formed on the toner image carrier are transferred to the recording medium. For this reason, the operating characteristics of the transfer process largely affect the image quality.

To cope with this situation, there is a conventional example in which the arrangement of layers of the intermediate transfer medium is devised to prevent the occurrence of faulty transfer due to defects of the intermediate transfer medium itself as well as the resultant deterioration of image quality. Further, in another conventional example which is premised on the arrangement of the tandem type, an attempt is made to solve the problem in the following manner. Namely, the transfer rate of a toner image earlier transferred to the intermediate transfer medium and that of a toner image subsequently transferred thereto are set at the same rate. In this conventional example, the range of resistance values of the intermediate transfer medium and the range of voltages to be applied to the intermediate transfer medium are prescribed for this purpose.

However, with the method using the intermediate transfer medium, it is also necessary to take the following aspect into consideration. The characteristics of the toner image carrier change due to changes in the surrounding environment and extended periods of use. This also applies to the intermediate transfer medium and a transfer unit. For this reason, even if optimum materials and electrical conditions are set, if the settings are fixed, it does not follow that optimum image formation can always be effected. Excellent image formation is difficult particularly in a process which operates by a combination of members whose changes in characteristics vary. In order to effect excellent image formation, not only should transferability be excellent, but also the image quality of the toner images themselves which are formed on the toner image carrier should be set in optimum conditions. Further, the toner images themselves should be provided with excellent electrostatic characteristics which match the transferability. Nevertheless, in proposals and studies made concerning the conventional image forming systems, control values have been fixed with respect to various processes and members.

SUMMARY OF THE INVENTION

An object of the present invention is to provide a color-image forming apparatus which is capable of eliminating the effects exerted by environmental changes and extended periods of use, and of always outputting high-quality color images on a stable basis.

Another object of the present invention is to attain the above object without involving additional installation of parts such as a sensor and the like, thereby preventing an increase in cost and preventing the apparatus from becoming large in size.

Still another object of the present invention is to provide a highly reliable apparatus which is capable of attaining the above objects without newly using a physical sensor, and of avoiding measurement errors due to the contamination and the like of a sensor surface.

A further object of the present invention is to effect image formation more appropriately by taking into consideration changes in the characteristics of a plurality of elements such as toner layers which are formed, the transfer unit, the recording medium, and the like.

Accordingly, in the present invention, the electrophotographic printer apparatus for printing a color image comprises a receptive layer for recording an electrostatic latent image; and a developer unit for applying toners of a number of colors to the electrostatic latent images. Further, the apparatus comprises an intermediate transfer medium to which the layered toner images formed on the receptive layer are transferred; and a power supply for applying a difference in potential between the intermediate transfer medium and the receptive layer. Still further, the apparatus comprises a current detector for detecting a value of an electric current flowing across the intermediate transfer medium and the receptive layer; and a transfer unit for transferring the toner image formed on the intermediate transfer medium to a recording medium. In addition, a main controller for effecting the following control is provided.

The main controller sets the potential difference between the intermediate transfer medium and the receptive layer to V1. At this time, the main controller obtains a current value I1 from the current detector when a toner layer is not present between the intermediate transfer medium and the receptive layer. Meanwhile, the main controller obtains a current value IX from the current detector when the toner layer is present between the intermediate transfer medium and the receptive layer. In addition, the main controller optimally corrects operating conditions of an image-forming element by determining characteristics of the toner layer on the basis of a difference between the current value I1 and the current value IX.

If the thickness of the toner layer which is formed, the density of toner particles, and the like change due to a change in the environment or extended periods of use, the difference between the current value I1 and the current value IX changes. In a preferred embodiment, the power of the light source and the amount of toner supplied are controlled in correspondence with the change in this difference so as to maintain optimum image forming conditions.

In addition, in accordance with another aspect of the present invention, the electrophotographic printer apparatus for printing a color image comprises a receptive layer on which an electrostatic latent image is formed; and a developer unit for developing the electrostatic latent image by toners of a number of colors. Further, the apparatus comprises an intermediate transfer medium to which toner images formed on the receptive layer are transferred; and a transfer unit for transferring the toner image formed on the intermediate transfer medium to a recording medium. Still further, the apparatus comprises a first power supply for applying a difference in potential between the intermediate transfer medium and the transfer unit; and a current detector for detecting a value of an electric current flowing across the intermediate transfer medium and the transfer unit. In addition, a main controller for effecting the following control is provided. The main controller obtains a current value $\Delta$I2 of the current flowing across the intermediate transfer medium and the transfer unit on the basis of an output of the current detector, and optimally corrects the potential difference between the intermediate transfer medium and the transfer unit on the basis of a difference between the current value $\Delta$I2 and an ideal value IB set in advance.

If the state of contact between the intermediate transfer medium and the transfer unit, and the like change due to a change in the environment or extended periods of use, the current value $\Delta$I2 changes. In a preferred embodiment, the potential of the transfer unit is controlled in correspondence with the change in this difference so as to maintain optimum image forming conditions.

In accordance with still another aspect of the present invention, the electrophotographic printer apparatus for printing a color image comprises a receptive layer on which an electrostatic latent image is formed; and a developer unit for developing the electrostatic latent image by toners of a number of colors. Further, the apparatus comprises an intermediate transfer medium to which toner images formed on the receptive layer are transferred; and a transfer unit for transferring the toner image formed on the intermediate transfer medium to a recording medium. Still further, the apparatus comprises a first power supply for applying a difference in potential between the intermediate transfer medium and the transfer unit; and a second power supply for allowing an electric current to flow across a pair of electrodes disposed on both sides of a transport passage for the recording medium. Also provided is a current detector for detecting the current flowing across the pair of electrodes. An addition, a main controller for effecting the following control is provided. The main controller obtains from the current detector the current when the recording medium is not present between the pair of electrodes. The main controller obtains from the current detector the current when the recording medium is present between the pair of electrodes. The main controller optimally corrects the potential difference between the intermediate transfer medium and the transfer unit on the basis of a difference between the current when the recording medium is not present and the current when the recording medium is present between the pair of electrodes.

If the humidity and the thickness of the recording medium used, and the like change, the difference in current changes when the recording medium is present between the electrodes and when it is not present. In a preferred embodiment, the potential of the transfer unit is controlled in correspondence with the change in this difference in current so as to maintain optimum image forming conditions.

The above and other objects, features and advantages of the present invention will become more apparent from the following detailed description of the invention when read in conjunction with the accompanying drawings.

BRIEF DESCRIPTION OF THE DRAWINGS

FIG. 1 is a block diagram illustrating the configuration of a color-image forming apparatus in accordance with an embodiment of the present invention;

FIG. 2 is a block diagram illustrating the configuration of a color-image forming apparatus in accordance with another embodiment of the present invention;

DESCRIPTION OF THE PREFERRED EMBODIMENTS

Figure 3:
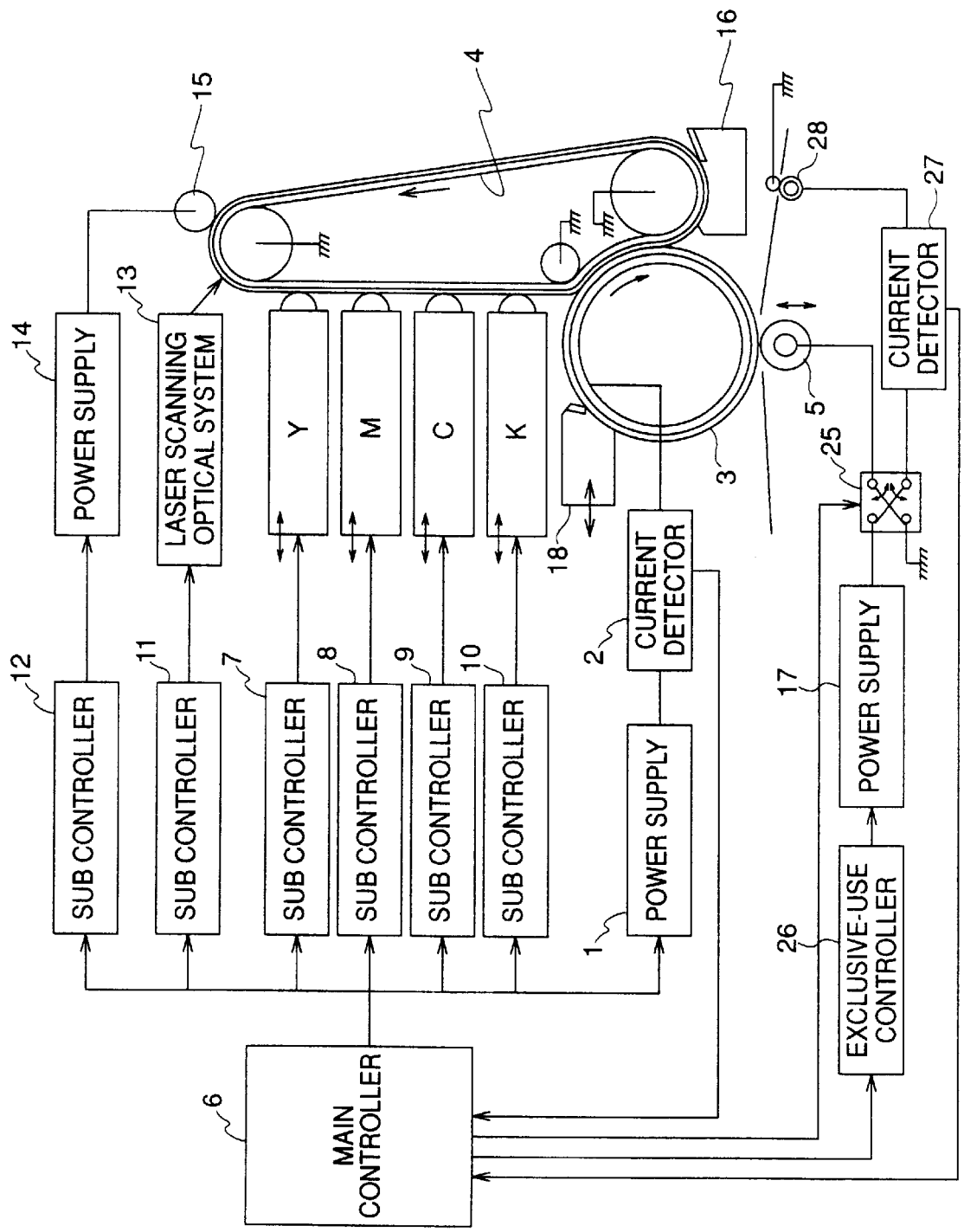
FIG. 3 is a block diagram illustrating the configuration of a color-image forming apparatus in accordance with still another embodiment of the present invention.

Referring now to FIG. 1, a description will be given of a first embodiment of the present invention. In FIG. 1, the respective parts are configured as follows. Reference numeral 1 denotes a power supply for an intermediate transfer medium. Numeral 2 denotes a current detector. Numeral 3 denotes an intermediate transfer medium. This intermediate transfer medium 3 is arranged such that an electrically conductive base material is covered with an electrically conductive thin resin layer. This intermediate transfer medium 3 is brought into contact with a photoconductive belt 4, having receptive layer, i.e., a toner image carrier, and rotates at the same speed. A charging roller 15, a laser scanning optical system 13 for forming an electrostatic latent image, and receptive layer cleaners 16 are provided in the vicinities of the photoconductive belt 4. Connected to the charging roller 15 among them is a power supply 14 for applying a predetermined voltage to the charging roller. Further, the receptive layer cleaners 16 are supported in such a manner as to be capable of coming into contact with the photoconductive belt 4. The receptive layer cleaners 16 are provided for toners of mutually different colors. Meanwhile, a transfer roller 5 and an intermediate transfer medium cleaner 18 are disposed in the vicinities of the intermediate transfer medium 3. The cleaner 18 can come in contact with and move away from the intermediate transfer medium 3. The transfer roller 5 is arranged such that the surface of an electrically conductive base material is covered with an electrically conductive elastic member. This transfer roller 5 is provided in such a manner as to be capable of coming into contact with and moving away from the intermediate transfermedium 3. Further, the transfer roller 5 is supported rotatably. A power supply 17 for applying a predetermined voltage to the transfer roller 5 is connected to the transfer roller 5. Y, M, C, and K respectively denote developer units for yellow, magenta, cyan, and black. The developer units Y, M, C, and K are respectively supported in such a manner as to be capable of coming into contact with and moving away from the photoconductive belt 4. Sub controllers 7 to 10 are respectively connected to the developer units Y, M, C, and K. Similarly, sub controllers 11 and 12 are also connected to the laser scanning optical system 13 and the power supply 14.

A main controller 6 inputs control signals to the power supply 1 for the intermediate transfer medium 3 and the power supply 17 for the transfer roller 5, and turns voltage outputs on and off. Further, the main controller 6 inputs control commands to the respective sub controllers 7 to 12, and preferably controls the following conditions:

the positions of the developer units Y, M, C, and K with respect to the photoconductive belt 4, as well as the amount of toner charged and the amount of toner supplied to the electrostatic latent image, the power of laser light outputted from the laser scanning optical system 13 and the time duration of light emission, and the charging potential of the charging roller 15.

In addition, the main controller 6 preferably controls the following conditions:

the timing of the coming-into-contact and moving-away operation of the intermediate transfer medium cleaner with respect to the intermediate transfer medium, the timing of the coming-into-contact and moving-away operation of the transfer roller with respect to the intermediate transfer medium, and the operation of other mechanisms necessary for image formation.

The main controller 6 effects feedback control on the basis of a current value detected by the current detector 2.

Figure 4:
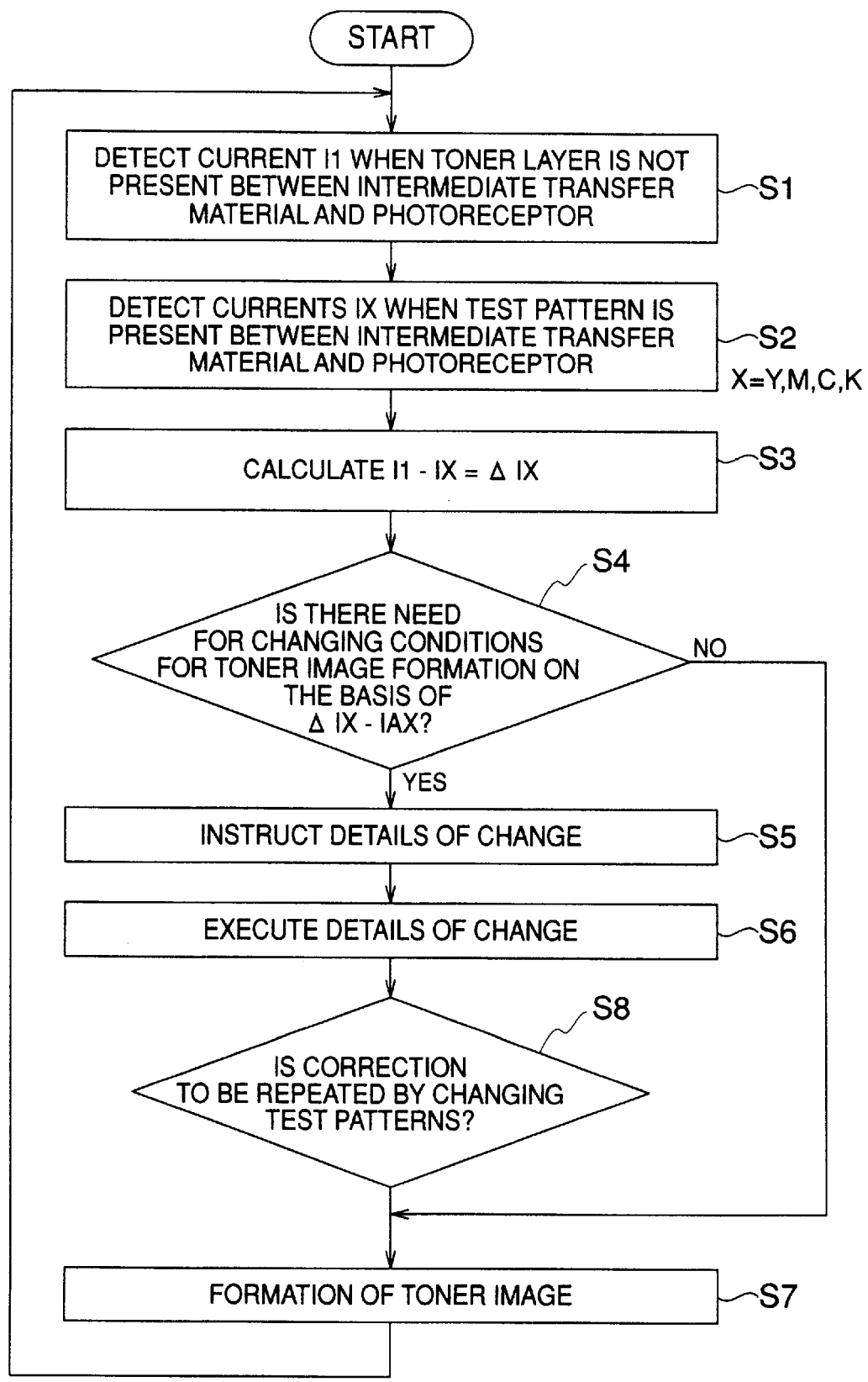
FIG. 4 is a flowchart illustrating a procedure of image formation by the apparatuses shown in FIGS. 1 to 3.

Next, a description will be given of the operation of this embodiment with reference to FIG. 4. First, the photoconductive belt 4 and the intermediate transfer medium 3 (contacted with the cleaner 18) are rotatively driven. As a result, the photoconductive belt 4 and the intermediate transfer medium 3 are cleaned. Then, the main controller 6 causes the power supply 1 to apply a voltage V1 to the intermediate transfer medium 3. Consequently, a current flows from the electrically conductive base material of the intermediate transfer medium to its surface resin layer. The current further passes through the photoconductive layer of the photoconductive belt 4 and flows to the grounded base material of the photoconductive belt 4. At this time, the current detector 2 detects a current I1 which flows across the intermediate transfer medium 3 (Step S1). In the meantime, the transfer roller 5 is spaced apart from the intermediate transfer medium 3.

Next, the main controller 6 causes toner images of test patterns to be formed on the photoconductive belt 4. The test patterns are stored in advance in the main controller. The test patterns are formed in such a manner as not to overlap with each other for the respective colors Y, M, C, and K. Each of the test patterns for the respective colors has a size which is equal to or larger than a region where the photoconductive belt 4 and the intermediate transfer medium 3 come into contact with each other. When electrostatic latent images of these test patterns are formed and developed, the main controller 6 sets the operating conditions of the laser scanning optical system 13, the charging roller 15, and the developer units Y, M, C, and K to default values which are fixed in advance. Each time the toner image of the test pattern for each color thus formed is transported consecutively between the photoconductive belt 4 and the intermediate transfer medium 3, the main controller 6 causes the power supply 1 to apply the voltage V1 to the intermediate transfer medium 3. The main controller 6 obtains currents IY, IM, IC, and IK detected by the current detector 2 in correspondence with the test patterns of the respective colors Y, M, C, and K (Step S2). In FIG. 4,"Y," "M," "C," and"K" are substituted in"X" to effect the subsequent processing of the flowchart. The currents IY, IM, IC, and IK detected here are values of currents which flow from the electrically conductive base material of the intermediate transfer medium 3 to its surface resin layer, passes through the toner layer, and flows from the photoconductive layer of the photoconductive belt 4 to the grounded base material of the photoconductive belt 4.

Data on the currents I1, IY, IM, IC, and IK are inputted to the main controller 6 where processing is effected. First, differences in which IY, IM, IC, and IK are respectively subtracted from I1 are determined (Step S3). These differences reflect the characteristics of the toner layers of the respective colors. Hereafter, the respective differences will be denoted by $\Delta IY$, $\Delta IM$, $\Delta IC$, and $\Delta IK$. Then, a comparison is made between the $\Delta IY$, $\Delta IM$, $\Delta IC$, and $\Delta IK$ and ideal values IAY, IAM, IAC, and IAK set in advance (Step S4). As these ideal values IAY, IAM, IAC, and IAK, values which are obtained when the best image is outputted are set in advance. For this reason, $\Delta IY-IAY$, $\Delta IM-IAM$, $\Delta IC-IAC$, and $\Delta IK-IAK$ are respectively calculated, and a determination is made as to whether or not each value is within a range of measurement errors or within a predetermined range of differences. If the result is within the range of measurement errors or within the predetermined range, the main controller 6 maintains the operating conditions of the developer units Y, M, C, and K, the laser scanning optical system 13, and the charging roller 15 as they are at the default values. The main controller 6 then instructs the formation of toner images on the basis of the image data which should be inherently outputted.

On the other hand, in a case where the characteristics of toner layers have changed due to changes in developing conditions accompanying changes in the surrounding environment and extended periods of use, there are cases where the result of calculation deviates from the range of measurement errors or the predetermined range. The only factor which affects this result is the characteristics (thickness, density, etc.) of the toner layers. It is possible to detect only the characteristics of the toner layers by obtaining IY, IM, IC, and IK under the aforementioned conditions. Accordingly, even if only the characteristics of the photoconductive belt 4 and the intermediate transfer medium 3 have changed, the changes do not affect the result of comparison with IAY, IAM, IAC, and IAK.

If the values of $\Delta IY-IAY$, $\Delta IM-IAM$, $\Delta IC-IAC$, and $\Delta IK-IAK$ have exceeded the predetermined ranges, the main controller 6 corrects the operating conditions of the developer units Y, M, C, and K, the laser scanning optical system 13, and the charging roller 15 in the direction in which the values are contained within the predetermined range. The main controller 6 outputs control signals for that purpose to the sub controllers 7 to 12 (Step S5). For example, according to the output of the current detector 2 obtained from the test patterns under the default control conditions, if it is determined that the electrical resistance of the toner layers is low, i.e., the amount of toner is small, the main controller 6 instructs an increase in the optical power of the laser scanning optical system 13 and an increase in the amount of toner supplied to the developer units Y, M, C, and K (Step S6). Here, the correction of the operating conditions concerning the formation of toner images may be repeated a number of times by changing the test patterns (Step S8). For instance, it is possible to consecutively use image-density adjusting patterns, gradation adjusting patterns, sharpness adjusting patterns, and the like.

After satisfactory conditions for formation of toner images are thus set, the main controller 6 allows toner images, which are based on the output data to be intrinsically outputted, to be formed on the photoconductive belt 4. The toner images are formed on the photoconductive belt 4 for the respective colors (Step S7). In addition, when the photoconductive belt 4 and the intermediate transfer medium 3 rotate, the toner images of the respective colors are guided to the region where the photoconductive belt 4 and the intermediate transfer medium 3 come into contact with each other. The toner images on the photoconductive belt 4 are transferred to the intermediate transfer medium 3 in this region. The main controller 6 controls the operating timings of the respective units such that the toner images can be transferred onto one location on the intermediate transfer medium 3 in a superposed manner. Subsequently, the transfer roller 5 transfer a single toner image in the number of colors formed on the intermediate transfer medium 3 onto a recording medium fed by a paper feeding unit. Before this transfer operation is effected, the transfer roller 5 is moved to the side of the intermediate transfer medium 3, comes into contact with the intermediate transfer medium 3 (or via the recording medium), and rotates. The color toner image transferred to the recording medium is fixed by a fixing station and is discharged therefrom. According to the above-described method, even if the characteristics of the toner layers have changed, satisfactory image formation can be effected at all times.

Next, referring to FIG. 2, a description will be given of another embodiment of the present invention. The color-image forming apparatus in accordance with this embodiment has a tandem-type arrangement having toner image carriers for the respective toner colors. Reference numerals 19Y, 19M, 19C, and 19K denote dielectric drums provided for the respective color toners as toner image carriers. Numerals 20Y, 20M, 20C, and 20K denote electrostatic heads for making electrostatic latent images on the dielectric drums 19Y, 19M, 19C, and 19K. Numerals 16Y, 16M, 16C, and 16K denote cleaners for the respective dielectric drums. Numeral 3A denotes an intermediate transfer belt. This intermediate transfer belt 3A, which is an endless belt, is trained between a drive roller 29a and a support roller 29b with a predetermined tension. The intermediate transfer belt 3A is formed from a belt-shaped member in which the surface of an electrically conductive base material is covered with an electrically conductive thin resin layer. The intermediate transfer belt 3A is disposed at a position where its electrically conductive thin resin layer comes into contact with the dielectric drums 19Y, 19M, 19C, and 19K. The transfer roller 5 and the transfer belt cleaner 18 are provided in the vicinities of the intermediate transfer belt 3A in the same way as in the above-described embodiment. In the embodiment of FIG. 2, the cleaner 18 is constantly in contact with the intermediate transfer belt 3A. The power supply 17 for the transfer roller is connected to the transfer roller 5 via a connection switcher 25. Sub controllers 7 to 10 and 21 to 24 are respectively connected to the developer units Y, M, C, and K and the electrostatic heads 20Y, 20M, 20C, and 20K. These sub controllers operate in response to control signals from the main controller 6. The switching operation of the connection switcher 25 is controlled by the main controller 6. Further, the power supply 17 for the transfer roller is controlled by an exclusive-use controller 26. This exclusive-use controller 26 controls the output voltage of the power supply 17 for the transfer roller upon receiving a control signal from the main controller 6. The power supply 1 for intermediate transfer is connected to the intermediate transfer belt 3A via the current detector 2 in the same way as in the above-described embodiment. The detected data from the current detector 2 is inputted to the main controller 6.

In addition, the main controller 6 also controls the mechanical operation of the respective units and their operating timings in the same way as in the above-described embodiment. The sub controllers 7 to 10 for the developer units Y, M, C, and K for the respective colors are also arranged in the same way as the above-described embodiment. The sub controllers 21 to 24 for the electrostatic heads 20Y, 20M, 20C, and 20K control the amounts of charge for recording and the recording time.

Figure 5:
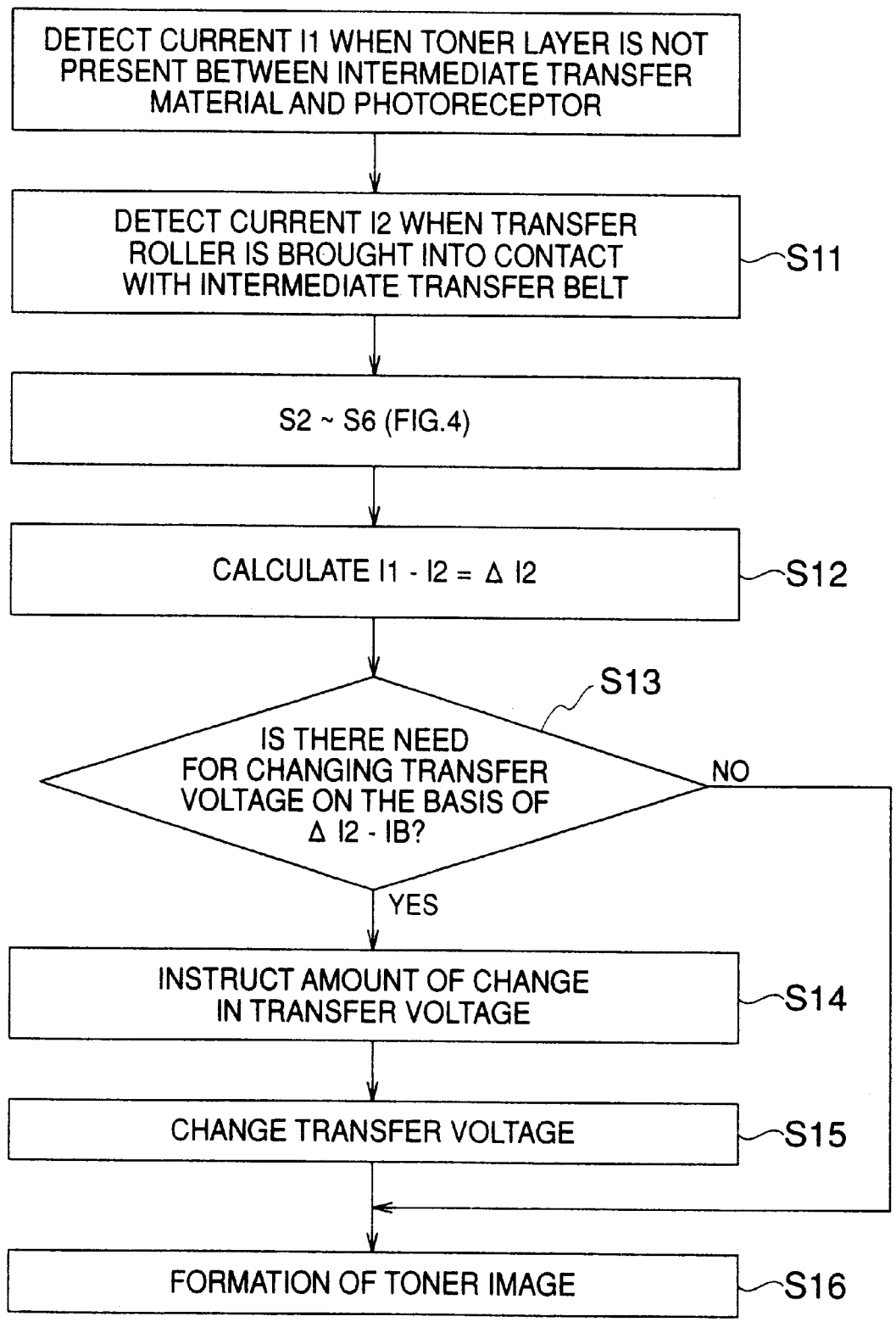
FIG. 5 is a flowchart illustrating a procedure of image formation by the apparatus shown in FIG. 2.

Next, referring to the flowcharts shown in FIGS. 4 and 5, a description will be given of the operation. First, the dielectric drums 19Y, 19M, 19C, and 19K and the intermediate transfer belt 3A are rotatively driven. Consequently, the dielectric drums 19Y, 19M, 19C, and 19K and the intermediate transfer belt 3A are cleaned. Subsequently, a voltage V1 is applied from the power supply 1 for intermediate transfer to the intermediate transfer belt 3A. At this time, the transfer roller 5 is controlled to be located at a position spaced apart from the intermediate transfer belt 3A. In this state, the current I1 which flows across the intermediate transfer belt 3A is detected by the current detector 2. Next, the transfer roller 5 is moved to the same position as the position to which the transfer roller 5 is located during the transfer operation. At this time, the transfer roller 5 is controlled by the connection switcher 25 in the state in which it is grounded. Subsequently, the voltage V1 is applied from the power supply 1 for intermediate transfer to the intermediate transfer belt 3A. The current detector 2 detects a current I2 which flows across the intermediate transfer belt 3A (Step S11).

Then, toner images of test patterns prepared in advance are formed on the dielectric drums 19Y, 19M, 19C, and 19K. The toner images of the test patterns are formed through cooperation between the electrostatic heads 20Y, 20M, 20C, and 20K and the developer units Y, M, C, and K for the respective colors. Each of the toner images of the test patterns which are formed has a size which is larger than the region of contact between the intermediate transfer belt 3A and each of the dielectric drums 19Y, 19M, 19C, and 19K. Here, the test patterns of the respective colors are formed by being offset from each other so that the timings at which the toner images are each brought into the nip between the dielectric drum and the intermediate transfer belt 3A will not coincide. The main controller 6 executes the formation of the toner images using the above-described test patterns on the basis on control values of default. The main controller 6 applies the voltage V1 to the intermediate transfer belt 3A at each timing at which the test pattern of each color is consecutively brought into the nip between the intermediate transfer belt 3A and the dielectric drum. As a result, the current values detected by the current detector 2 for the test patterns of the respective colors are obtained as IY, IM, IC, and IK. At this time, the timings are controlled so that the dielectric drums 19Y, 19M, 19C, and 19K will not transport the toner layers between the dielectric drums and the intermediate transfer belt 3A at the same time. In addition, while the currents IY, IM, IC, and IK are being detected, the transfer roller 5 is controlled at the position where it is spaced apart from the intermediate transfer belt 3A.

The currents I1, I2, IY, IM, IC, and IK detected in the above-described operation flow through the following route. The current I1 flows from the electrically conductive base material of the intermediate transfer belt 3A to its surface resin layer, passes through the dielectric layer of each dielectric drum, and flows from each dielectric base material to a ground. The current I2, in addition to the flowing route of I1, passes through the electrically conductive elastic member at the surface of the transfer roller 5, and flows from its base material to the ground. The currents IY, IM, IC, and IK flows from the electrically conductive base material of the intermediate transfer belt 3A to its surface resin layer, pass through the toner layer of one of the colors, and flow from the dielectric layer of each dielectric drum to the grounded dielectric base material.

The detected current values I1, I2, IY, IM, IC, and IK are inputted to the main controller 6 to effect processing. Here, the processing which is executed by the main controller 6 on the basis of I1, IY, IM, IC, and IK is similar to that of the above-described embodiment. However, the main controller 6 controls the amounts of charge for recording and the recording time of the electrostatic heads 20Y, 20M, 20C, and 20K, instead of the operation of the charging roller and the laser scanning optical system which are controlled in the above-described embodiment. The main controller 6 calculates $\Delta IY$, $\Delta IM$, $\Delta IC$, and $\Delta IK$ in the same way as in the above-described embodiment, and compares them with the preset standard values IAY, IAM, IAC, and IAK. The main controller 6 sends control commands to the sub controllers 21 to 24 so that respective values of $\Delta IY-IAY$, $\Delta IM-IAM$, $\Delta IC-IAC$, and $\Delta IK-IAK$ fall within predetermined small differences. As a result, it becomes possible to form satisfactory toner images on the respective dielectric drums 19Y, 19M, 19C, and 19K in the same way as in the above-described embodiment.

Further, in this embodiment, the main controller 6 calculates a difference between I1 and I2. The result of this calculation reflects changes in the characteristics of the transfer roller 5 (Step S12). In the following description, I1–I2 will be set as $\Delta I2$. This $\Delta I2$ is compared with an ideal current value IB which should flow across the transfer roller 5 when the main controller 6 adopts default control values. As a result of this comparison, if $\Delta I2-IB$ is within the range of measurement errors and is within the range of a predetermined small difference, the main controller 6 maintains the value of voltage, which should be applied from the power supply 17 for the transfer roller to the transfer roller 5, at the default value as it is. Meanwhile, when the electrical resistance of the transfer roller 5 has changed due to a change of the surrounding environment, etc., $\Delta I2-IB$ becomes equal to or greater than the predetermined small difference. In this case, the main controller 6 calculates an output V2 of the power supply 1 for intermediate transfer such that $\Delta I2-IB$ falls within the predetermined small difference. The output V2 is determined by a characteristic curve set in correspondence with fluctuations in the electrical resistance of the transfer roller 5 (Step S13).

Then, the main controller 6 calculates V1–V2. This difference constitutes a portion of change from a transfer voltage of default in a case where transfer is effected from the intermediate transfer belt 3A to the recording medium with transfer roller 5 (Step S14). Namely, the voltage applied to the transfer roller 5 is changed by V1–V2 (Step S15).

For example, if $\Delta I2$ is 4 $\mu A$ and IB is 2.5 $\mu A$, then $\Delta I2-IB$ is 1.5 $\mu A$. This means that the electrical resistance of the transfer roller 5 has declined. Here, if transfer to the recording medium with the transfer roller 5 is effected under the controlled state of default, a high electric field is applied to the toner layer which is transferred, thereby hampering satisfactory transfer. It is now assumed that in order to set $\Delta I2-IB$ to 0.2 $\mu A$ or less, the intermediate transfer voltage to be applied to the intermediate transfer belt 3A needs to be lowered by 250 V. That is, it is assumed that a calculation has been made that V1–V2=250 V. Accordingly, a value in which 250 V is added to the default value is used as the transfer voltage to be applied to the transfer roller 5 when transfer to the transfer roller is effected. Here, it is also possible to directly control the voltage to be applied to the intermediate transfer belt 3A. However, if the proper use of the electrostatic heads is taken into consideration, it is desirable to change the potential of the transfer roller rather than changing the potential of the intermediate transfer belt 3A. In accordance with this embodiment, the transfer to the recording medium with the transfer roller 5 can be effected satisfactorily by controlling the voltage applied to the transfer roller without changing the voltage applied to the intermediate transfer belt 3A.

The main controller 6 outputs predetermined control signals to the sub controllers 21 to 24 and the exclusive-use controller 26, and after the operating conditions of the respective units are provided, the main controller 6 changes the switch 25 to power supply 17 and effects the printout of an image in accordance with external print data. The toner images of the respective colors formed by the electrostatic heads 19Y to 19K are subjected to timing control such that they are transferred by being superposed at the same position on the intermediate transfer belt 3A. As the rotation of the intermediate transfer belt 3A advances, a single toner image in the number of colors formed on the intermediate transfer belt 3A is guided into the nip with the transfer roller 5, and are transferred to the recording medium. Subsequently, the recording medium is sent to the fixing station where the toner image is fixed (Step S16).

In accordance with this embodiment, satisfactory image formation can be effected on a stable basis even in a case where there have been changes in the respective characteristics of the dielectric drums 19Y, 19M, 19C, and 19K, the intermediate transfer belt, the toner, and the transfer roller 5.

Next, referring to FIG. 3, a description will be given of still another embodiment of the present invention. In this embodiment, satisfactory color-image formation is effected by taking into consideration the characteristics of the recording medium as well. In addition to the configuration of the first embodiment, the apparatus is provided with the connection switch 25 which is juxtaposed to the transfer roller 5. Further, the power supply 17 for the transfer roller is connected to the connection switch 25. Still further, a pair of resist rollers 28 is provided upstream of the transfer roller 5 along the medium transporting passage. Of these units, the connection switch 25 effects a switchover in connecting the transfer roller 5 to the power supply 17 for the transfer roller or to the ground. In addition the connection switch 25 also effects a switchover in connecting one of the resist rollers 28 to the power supply 17 for the transfer roller or to the ground. These switching operations are effected by the instruction from the main controller 6. Here, one of the resist rollers 28 comprise an electrically conductive base material. The surface of the resist roller 28 is covered with a semi-conducting member. The other one of the resist rollers 28 is an electrically conductive roller and is grounded. Further, reference numeral 27 denotes a second current detector. This second current detector 27 detects a current which flows across the pair of resist rollers 28, and inputs the data to the main controller 6. The exclusive-use controller 26 is connected to the power supply 17 for the transfer roller. This exclusive-use controller 26 controls the output of the power supply for the transfer roller in response to the instruction from the main controller 6. The other arrangements are similar to those of the first embodiment.

Figure 6:
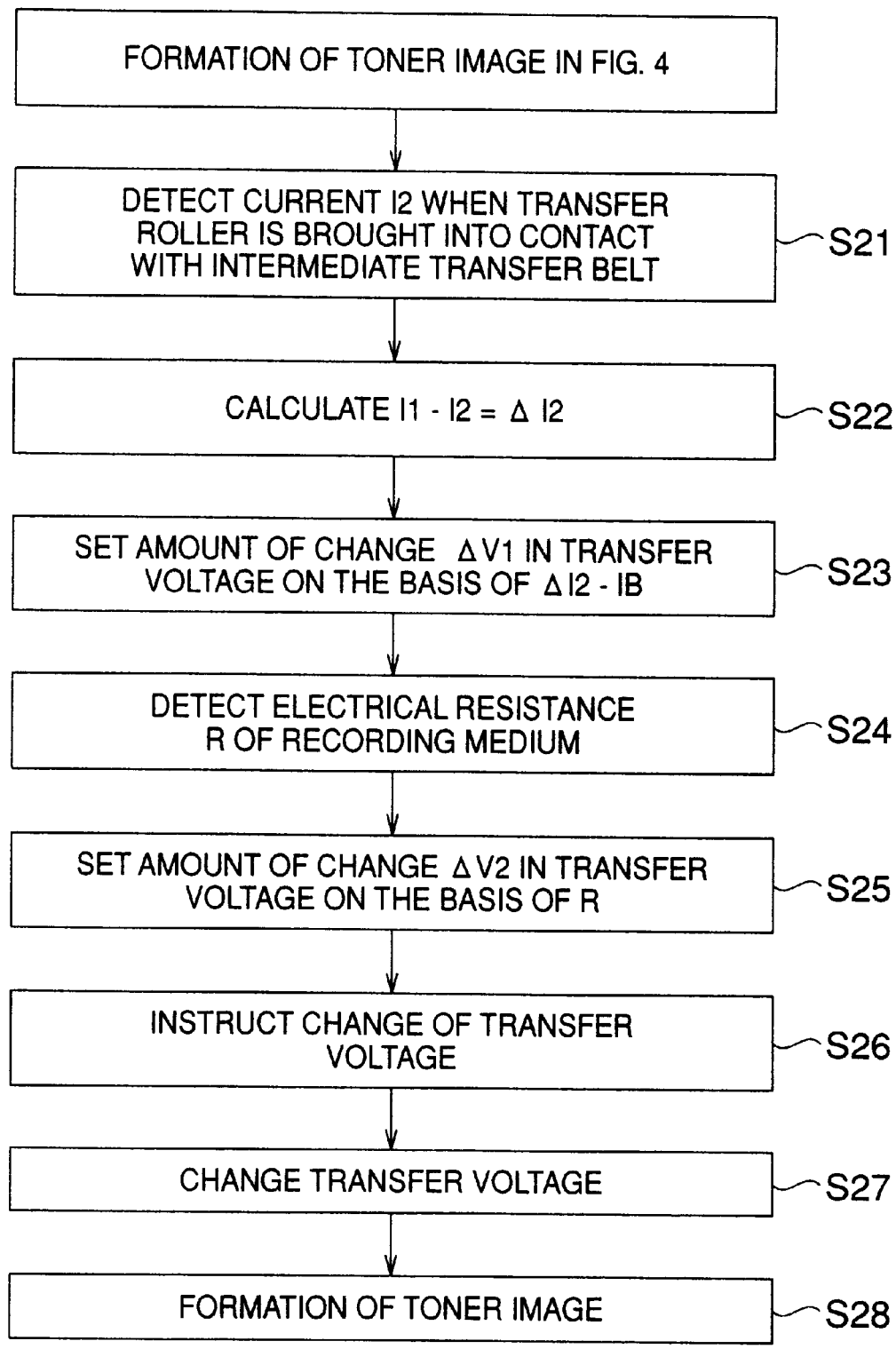
FIG. 6 is a flowchart illustrating a procedure of image formation by the apparatus shown in FIG. 3.

Next, referring to FIGS. 4 and 6, a description will be given of the operation of this embodiment. Since the detection of I1, IY, IM, IC, and IK and the processing for changing the toner-image forming conditions based thereon, which are effected prior to the image formation, are similar to those of the first embodiment, a description thereof will be omitted. In the state in which the toner is not present between the photoconductive belt 4 and the intermediate transfer medium 3, the main controller 6 first controls the connection switch 25, and grounds the transfer roller 5. Next, the main controller 6 controls the position of the transfer roller 5, and moves the transfer roller 5 to its transfer-executing position where it abuts against the intermediate transfer medium 3. Subsequently, the main controller 6 controls the power supply 1, and applies the voltage V1 to the intermediate transfer medium 3. Then, the main controller 6 obtains the current I2 detected by the current detector 2 (Step S21). Here, the current I1 flows from the electrically conductive base material of the intermediate transfer medium 3 to its surface resin layer, passes through the photoconductive layer of the photoconductive belt 4 and flows to the ground from the base material of the photoconductive belt 4. The current I2, in addition to the flowing route of I1, passes through the electrically conductive elastic member covering the surface of the transfer roller, and flows from its base material to the ground. On the basis of I1 and I2, the main controller 6 calculates ΔI2 in the same way as in the second embodiment (Step S22). Subsequently, the main controller 6 calculates ΔI2−IB in the same way as in the second embodiment. If this value is within the range of measurement errors or within the range of the predetermined small difference, the main controller 6 maintains at the default value the voltage which should be applied from the power supply 17 for the transfer roller to the transfer roller 5. Meanwhile, in a case where the electrical resistance of the transfer roller 5 has changed due to a change in the surrounding environment, and ΔI2−IB has become equal to or greater than the predetermined difference, the main controller 6 calculates the output V2 in the same way as in the second embodiment. Subsequently, the main controller 6 calculates V1−V2. This difference constitutes the amount of change of the voltage applied to the transfer roller 5 during transfer from the default voltage. Hereafter, this difference V1−V2 will be referred to as ΔV1 (Step S23).

Then, the main controller 6 controls the position of the transfer roller 5, and cancels the contact of the transfer roller 5 with the intermediate transfer medium 3. Next, the main controller 6 controls the connection switch 25, and connects the power supply 17 to one of the resist rollers 28 (at this time the transfer roller 5 is grounded). As a result, current flows across the resist rollers 28 from the power supply 17. The second current detector 27 detects the current flowing across the resist rollers 28, and inputs the same to the main controller 6. Next, the main controller 6 feeds the recording medium into the nip between the pair of resist rollers 28. Resistance is imparted to the current detected by the second current detector 27 in correspondence with the characteristics of the recording medium. The main controller 6 obtains the current detected by the second current detector 27 at this time. Then, the main controller 6 calculates an electrical resistance R of the recording medium on the basis of the difference between the current prior to the feeding of the recording medium into the nip between the resist rollers 28 and the current subsequent to the feeding of the recording medium (Step S24).

Subsequently, the main controller 6 compares the electrical resistance R with the default value. As compared with a standard medium for which the default value has been prescribed, in thick paper, thin paper, tracing paper, and the like, an error occurs in the resistance R of the recording medium from the default value. In addition, even in the case where the recording medium which is fed is the standard paper, the recording medium is affected by the change in the surrounding environment and its storage state, so that its resistance R changes. On the basis of the amount of deviation of the resistance R from the default value, the main controller 6 calculates an optimum voltage VT to be applied to the transfer roller 5. The difference between this optimum voltage VT and the default voltage set as the voltage to be applied to the transfer roller 5 is set as ΔV2 (Step S25).

Subsequently, the main controller 6 causes a toner image based on external print data to be formed on the intermediate transfer medium 3 in a process similar to that of the first embodiment. The recording medium is transported to the transfer position in conjunction with this operation. In the meantime, the main controller 6 controls the connection switch 25 to connect the power supply 17 to the transfer roller 5. Then, in the execution stage of the transfer operation, the power supply 17 is controlled via the exclusive-use controller 26 so as to output a voltage in which ΔV1 and ΔV2 are added to or subtracted from the default voltage (Step S26). For example, it is assumed that ΔV1 has been calculated as 250 V and ΔV2 as 200 V. In this case, the voltage to be applied to the transfer roller as set to a value in which the default value is increased by ΔV1=250 V and lowered by ΔV2=200 V. Accordingly, the voltage applied to the transfer roller is set 50 V higher than the default voltage in total (Step S27).

Under this transfer voltage, a color-toner image formed on the intermediate transfer medium 3 is transferred to a predetermined position on the recording medium. The recording medium with the image transferred thereto is transported to the fixing station (not shown) where the image is fixed, and the recording medium is then discharged (Step S28). Thus, in accordance with this embodiment, it is possible to effect satisfactory image formation in a stable basis in correspondence with the characteristics of and changes in the photoconductive belt 4, the intermediate transfer medium 3, the toner layer, the transfer roller 5, and the recording medium.

Here, in this embodiment, the detection of resistance of the recording medium is executed as one step of the image forming operation. However, an arrangement may be provided such that the main controller 6 is adapted to receive designation of a recording medium from an external circuit such as a dip switch, a soft switch, or the like so as to set ΔV2.

As described above, in accordance with the present invention, the following advantages can be obtained.

In the present invention, the characteristics of elements which affect image formation are detected in real time, and image formation is effected under appropriate conditions in correspondence with changes in the characteristics. For this reason, color images can always be formed satisfactorily on a stable basis. At that time, the detection of the characteristics is effected by the detection of the current. Therefore, the detection of the characteristics can be realized by partially changing a conventional electric circuit. It is unnecessary to additionally provide a component part such as a sensor. For this reason, it is possible to prevent an increase in cost and prevent the apparatus from becoming large in size. In a case where a mechanical sensor is used in the detection of characteristics, there are cases where a measurement error can occur due to the contamination of the sensor surface. In the present invention, however, the detection of the characteristics is effected by the detection of the current. Accordingly, there is no need to take into consideration the contamination and the like of the sensor. For this reason, the reliability is high. In a case where the characteristics are detected with respect to the transfer roller or the recording medium as well, it is possible to effect more appropriate image formation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 8-344036 (filed on Dec. 24th, 1996) including specification, claims, drawings and summary are incorporated herein by reference in its entirety.

What is claimed is:

1. A color image forming apparatus for printing a color image, comprising:
   a receptive layer for recording an electrostatic latent image;
   a developer unit for applying toners of a number of colors to the electrostatic latent images;
   an intermediate transfer medium to transfer the layered toner images formed on the receptive layer;
   a power supply for applying a difference in potential between the intermediate transfer medium and the receptive layer;
   a current detector for detecting a value of an electric current flowing across the intermediate transfer medium and the receptive layer;
   a transfer unit for transferring the toner image formed on the intermediate transfer medium to a recording medium; and
   a main controller including the following functions:
      (i) setting the potential difference between the intermediate transfer medium and the receptive layer to V1;
      (ii) obtaining a current value I1 from the current detector when a toner layer is not present between the intermediate transfer medium and the receptive layer;
      (iii) obtaining a current value IX from the current detector when the toner layer is present between the intermediate transfer medium and the receptive layer; and
      (iv) optimally correcting operating conditions of an image-forming element by determining characteristics of the toner layer on the basis of a difference between the current value I1 and the current value IX.

2. An electrophotographic printer apparatus according to claim 1, wherein the power supply applies the voltage V1 to the intermediate transfer medium, and the receptive layer is grounded.

3. An electrophotographic printer apparatus according to claim 2, wherein the current detector detects the current flowing across the intermediate transfer medium.

4. An electrophotographic printer apparatus according to claim 3, wherein the main controller causes the transfer unit to be spaced apart from the intermediate transfer medium when the current values I1 and IX are obtained from the current detector.

5. An electrophotographic printer apparatus according to claim 1, wherein the main controller includes the following functions:
   (i) forming on the receptive layer, of a toner image of a test pattern for each color of Y, M, C, and K;
   (ii) obtaining current values IY, IM, IC, and IK from the current detector for the test patterns of the respective colors as the current values IX each time the toner images of the test patterns of the respective colors are consecutively brought into a nip between the receptive layer and the intermediate transfer medium; and
   (iii) optimally correcting the operating conditions of the image-forming element by individually determining the characteristics of the toner layers of the respective colors on the basis of the respective differences between the current value I1 and each of the current values IY, IM, IC, and IK.

6. An electrophotographic printer apparatus according to claim 5, wherein the toner image of the test pattern is equal to or larger than a region where the receptive layer and the intermediate transfer medium come into contact with each other.

7. An electrophotographic printer apparatus according to claim 1, wherein the receptive layer has a charging unit for charging a surface of the receptive layer and a light source for forming the electrostatic latent image, and the main controller controls the power of the light source for optimally correcting the operating conditions.

8. An electrophotographic printer apparatus according to claim 1, wherein the main controller optimally corrects the operating conditions by controlling an amount of toner supplied by the developer unit.

9. An electrophotographic printer apparatus according to claim 1, wherein the main controller is maintaining default operating conditions if the difference between the current value I1 and the current value IX is within a prescribed range set in advance; wherein the main controller optimally corrects the operating conditions if the difference between the current value I1 and the current value IX exceeds the prescribed range set in advance.

10. An electrophotographic printer apparatus for printing a color image, comprising:
   a receptive layer for recording an electrostatic latent image;
   a developer unit for applying toners of a number of colors to the electrostatic latent image;
   an intermediate transfer medium to transfer toner images formed on the receptive layer;
   a transfer unit for transferring the toner image formed on the intermediate transfer medium to a recording medium;

a first power supply for applying a different in potential between the intermediate transfer medium and the transfer unit;

a current detector for detecting a value of an electric current flowing across the intermediate transfer medium, the transfer unit and the developer unit; and a main controller to adjust the potential difference between the intermediate transfer medium and the transfer unit by adjusting the voltage applied to the transfer unit on the basis of an output of the current detector and an ideal value set in advance;

wherein the main controller adjusts an amount of charge for recording and a recording time of the developer unit based on an output of the current detector and an ideal value set in advance.

11. An electrophotographic printer apparatus according to claim 10, wherein the first power supply applies a voltage V1 to the intermediate transfer medium, and the receptive layer is grounded.

12. An electrophotographic printer apparatus according to claim 10, wherein the current detector detects a value of the current flowing across the intermediate transfer medium, and wherein the main controller including following functions:

(i) obtaining from the current detector a current value I1 when the transfer unit is being spaced apart from the intermediate transfer medium;

(ii) obtaining from the current detector a current value I2 when the transfer unit is in contact with the intermediate transfer medium, and (iii) calculating ΔI2 from I2−I1.

13. An electrophotographic printer apparatus according to claim 10, wherein the main controller includes the following functions:

(i) setting the potential difference between the intermediate transfer medium and the transfer unit to a default value if the difference between the current value ΔI2 and the ideal value IB is within a prescribed range set in advance;

(ii) optimally correcting the potential difference between the intermediate transfer medium and the transfer unit if the difference between the current value ΔI2 and the ideal value IB exceeds the prescribed range set in advance.

14. An electrophotographic printer apparatus according to claim 10, wherein the transfer unit having a connection switch for selectively connecting the transfer unit to a second power supply or to a ground, and the main controller including following functions:

(i) connecting the transfer unit to the ground for correcting the potential difference between the intermediate transfer medium and the transfer unit; and (ii) connecting the transfer unit to the second power supply for transferring the toner image from the intermediate transfer medium to a recording medium.

15. An electrophotographic printer apparatus according to claim 10, wherein the main controller changes the voltage to be applied to the transfer unit for correcting the potential difference between the intermediate transfer medium and the transfer unit.

16. An electrophotographic printer apparatus for printing a color image, comprising:

a receptive layer for recording an electrostatic latent image;

a developer unit for applying toners of a number of colors to the electrostatic latent image;

an intermediate transfer medium to transfer toner images formed on the receptive layer;

a transfer unit for transferring the toner image formed on the intermediate transfer medium to a recording medium;

a first power supply for applying a difference in potential between the intermediate transfer medium and the receptive layer;

a second power supply for allowing an electric current to flow across a pair of electrodes disposed on both sides of a transport passage for the recording medium;

wherein the second power supply can also apply a difference in potential between the intermediate transfer medium and the transfer unit;

a first current detector for detecting a value of an electric current flowing across the intermediate transfer medium and the receptive layer;

a second current detector for detecting the current flowing across the pair of electrodes; and a main controller including following functions;

(i) setting the potential difference between the intermediate transfer medium and the receptive layer to V1;

(ii) obtaining a current value I1 from the first current detector when a toner layer is not present between the intermediate transfer medium and the receptive layer;

(iii) obtaining a current value IX from the first current detector when the toner layer is present between the intermediate transfer medium and the receptive layer;

(iv) correcting operating conditions of an image-forming element by determining characteristics of the toner layer on the basis of a difference between the current value I1 and the current value IX;

(v) obtaining from the second current detector the current when the recording medium is not present between the pair of electrodes;

(vi) obtaining from the second current detector the current when the recording medium is present between the pair of electrodes; and (vii) optimally further correcting the conditions of an image-forming element on the basis of a difference between the current detected by the second current detector when the recording medium is not present and the current when the recording medium is present between the pair of electrodes.

17. An electrophotographic printer apparatus according to claim 16, wherein the second power supply also serves as a power supply for applying the voltage to the transfer unit.

18. An electrophotographic printer apparatus according to claim 16, wherein the main controller includes the following functions:

(i) setting the potential difference between the intermediate transfer medium and the transfer unit to a default value if the difference of two current values is within a prescribed range set in advance, wherein one current value relates to when the recording medium is not present, other current value relates to when the recording medium is present;

(ii) optimally correcting the potential difference between the intermediate transfer medium and the transfer unit if the difference of two current values exceeds the prescribed range set in advance, wherein one current value relates to when the recording medium is not present, other current value relates to when the recording medium is present.

19. An electrophotographic printer apparatus according to claim 16, wherein the main controller changes the voltage to be applied to the transfer unit for correcting the potential difference between the intermediate transfer medium and the transfer unit.

20. An electrophotographic printer apparatus according to claim 16, wherein the pair of electrodes disposed on both sides of the transport passage for the recording medium is a pair of rollers.

* * * * *